United States Patent

Simsack

[15] 3,703,624
[45] Nov. 21, 1972

[54] SELF CONTAINED SOLDER IRON KIT

[72] Inventor: Anton Simsack, 231 East High Street, Elizabethtown, Pa. 17022

[22] Filed: Nov. 18, 1970

[21] Appl. No.: 90,613

[52] U.S. Cl. ..................219/229, 16/110.5, 30/125, 145/62, 219/230, 219/236, 219/533, 228/52
[51] Int. Cl. .........................B23k 3/02, H05b 3/02
[58] Field of Search.................219/221-242, 533, 219/421; 401/1, 2, 3, 89, 118, 123-125; 228/51-55, 57; 145/62; 16/110.5; 30/125, 140; 174/46; 132/75, 81; 222/191

[56] References Cited

UNITED STATES PATENTS

| | | | |
|---|---|---|---|
| 1,826,933 | 10/1931 | Hazlett et al. | 219/240 |
| 2,297,303 | 9/1942 | Humfeld | 219/232 X |
| 541,408 | 6/1895 | Willson | 228/57 |
| 2,372,859 | 4/1945 | Sparks | 219/231 UX |
| 2,592,426 | 4/1952 | Jeffrey | 219/236 UX |
| 3,267,254 | 8/1966 | Weller et al. | 219/240 X |
| 10,500 | 2/1854 | Chamberlain | 145/62 |
| 518,106 | 4/1894 | Johnson | 145/62 |
| 670,799 | 3/1901 | Miller | 16/110.5 X |
| 3,426,813 | 2/1969 | Robertson | 16/110.5 X |
| 1,928,576 | 9/1933 | Stedley | 228/51 X |
| 2,692,935 | 10/1954 | Pearce et al. | 219/232 X |

FOREIGN PATENTS OR APPLICATIONS

| | | | |
|---|---|---|---|
| 907,359 | 6/1945 | France | 145/62 |
| 678,421 | 12/1964 | Italy | 219/241 |

*Primary Examiner*—A. Bartis
*Attorney*—Wenderoth, Lind & Ponack

[57] ABSTRACT

A self-contained solder iron kit which includes an electrically operated soldering iron with a cord storage area provided on the medial portion of the elongated handle, and a storage area provided within the end of the handle remote from the soldering point. The storage area provides for and includes all the necessary soldering materials such as chemicals, flux, fluids, and assorted soldering rods, thereby conveniently embodying everything into one compact kit. Provision is made for double hermetically sealing off the chemicals to avoid potential leakage of corrosion or fumes.

3 Claims, 3 Drawing Figures

INVENTOR
ANTON SIMSACK
BY
Wenderoth, Lind & Ponack
ATTORNEYS

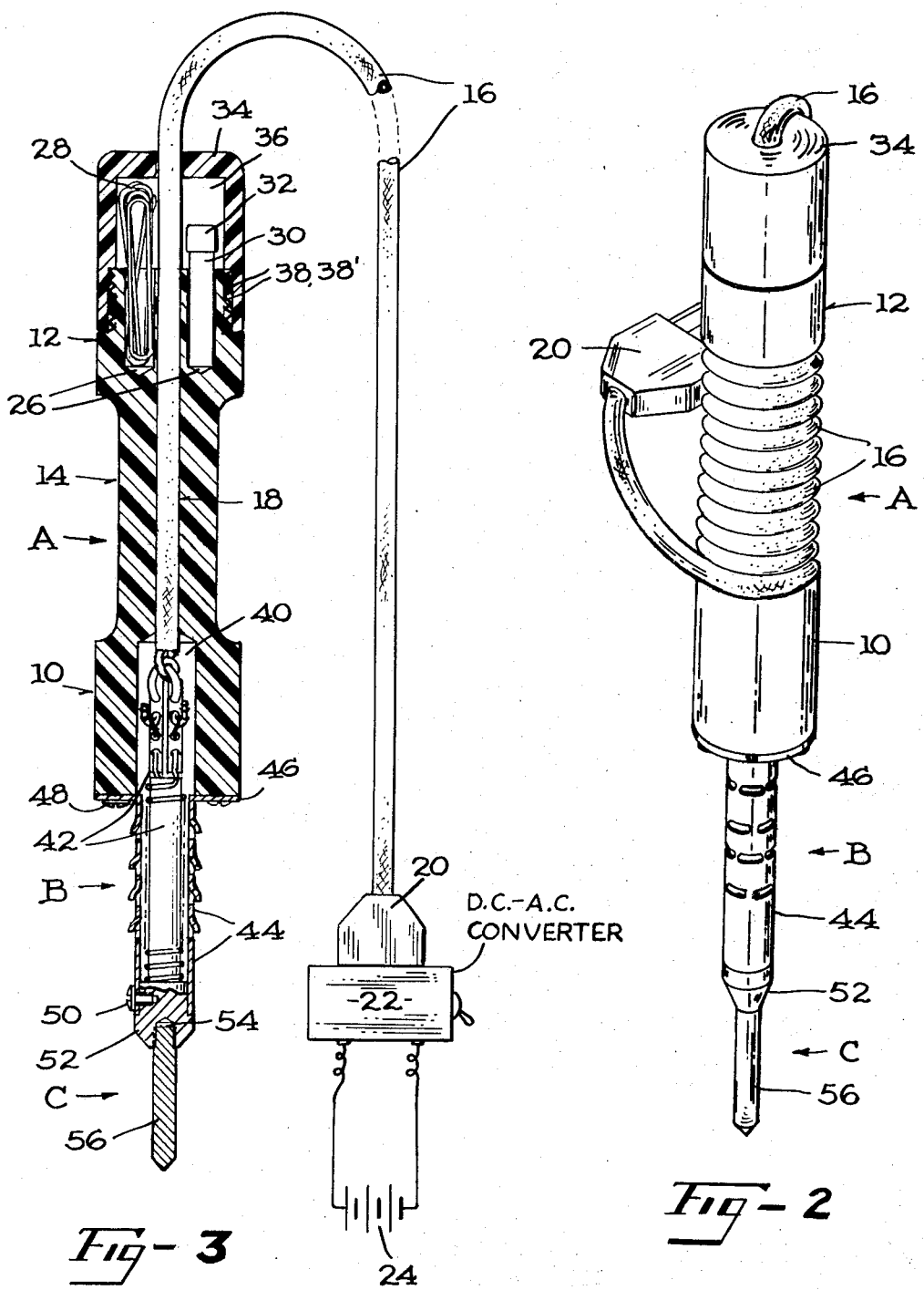

SELF CONTAINED SOLDER IRON KIT

The present invention relates generally to an implement for applying soldering metal or metallic compounds, and more particularly relates to a simplified, efficient and compact soldering iron kit embodying all the necessary soldering materials generally within the handle portion of the soldering iron which is preferably of the electrically heated type.

A principal object of the invention is to provide a novel soldering iron kit which embodies essentially all of the electrical elements (except for the power source), and all of the soldering elements or materials, such as the necessary chemicals, flux, fluids and assorted soldering rods, into one conveniently compact unit.

A further object is to provide a soldering kit of the aforesaid character which provides for hermetically doubly sealing the compartments housing the chemical elements to avoid leakage and discharge of potential oxidized fumes and/or corrosion, thereby making it more suitable for home hobbyists as well as professional craftsmen.

These and other objects and advantages are achieved by providing an elongated handle suitably attached to a forwardly disposed heating element and soldering point or tip. The handle is fabricated of heat and electrical insulating material and is reduced in cross-section throughout its medial portion to receive thereabout the electrical cord used to operatively connect the heating elements in the soldering tip with a source of electrical power, when the cord or iron are not in use. The reduced medial area not only provides for cord storage, but also aids in heat dissipation to some extent. The end of the handle, preferably beyond the medially reduced portion, is provided with a removable, generally hollow, end cap attachable by complemental close fitting screw threads on the respective handle portions, to help better seal the storage compartment area. The electrical power cord is disposed generally throughout the axial center of the handle and cap, and a plurality of storage pockets are provided in the main handle portion radially around the centrally disposed electrical cord. These pockets are used to store smaller cylindrical compartments of the various chemicals and flux compositions, as well as the various soldering metallic wires or rods. The iron can be used by plugging it into any conventional electrical outlet, or by attachment to a car battery in association with a suitable transformer device.

The construction, objects and advantages may be better understood when considered in conjunction with the following more detailed description together with the accompanying illustrative drawings, wherein like reference characters designate like parts through the various figures, and wherein:

FIG. 2 is a similar perspective view, but showing the cap in its applied condition and showing the cord wound upon the storage handle; and FIG. 3 is a longitudinal cross-sectional view better showing exemplary interior constructional details of the kit and also showing a partially schematic modified electrical connection with a battery source.

Figure 1:
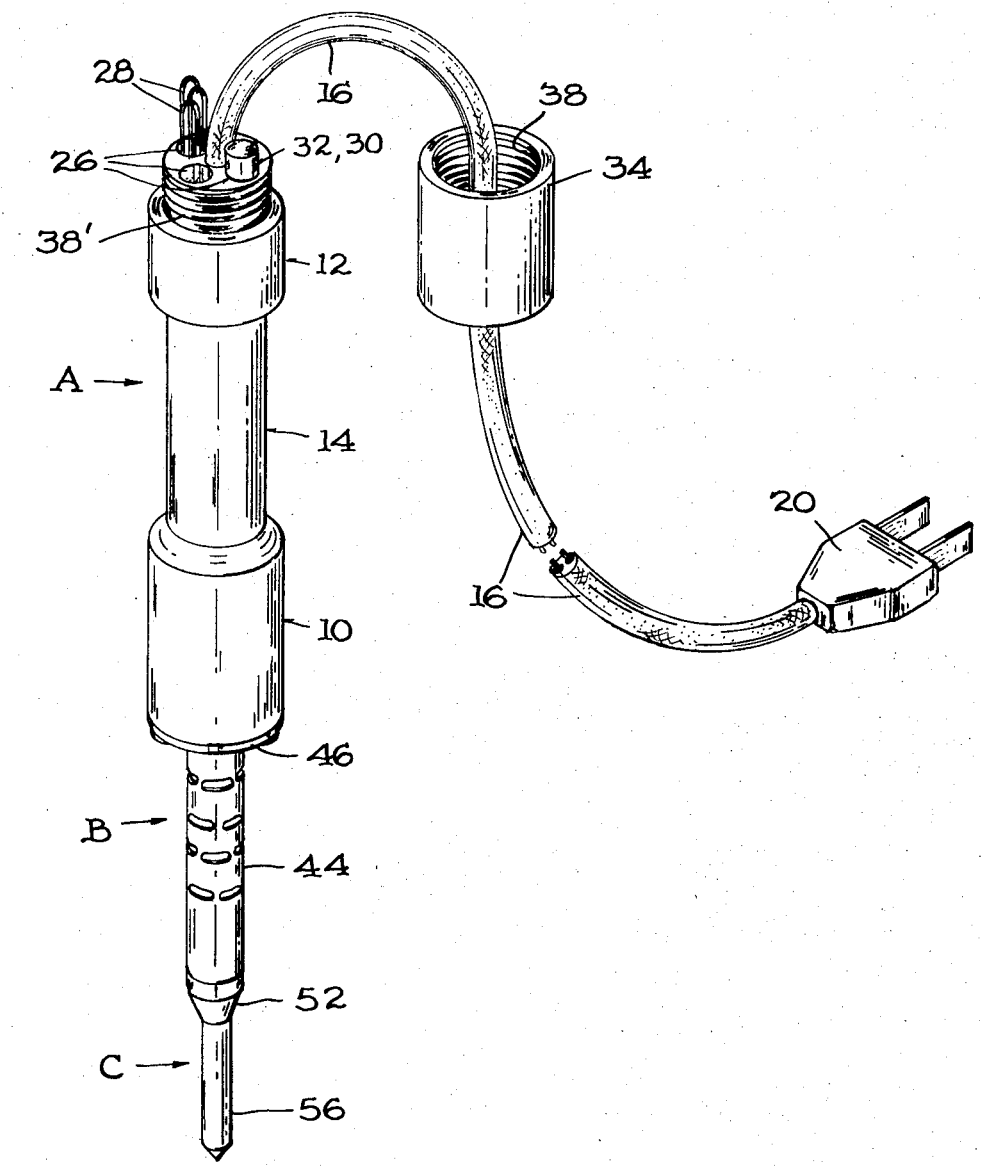
FIG. 1 is a perspective elevational view of a preferred form of the soldering kit, showing the storage compartment cap in the removed condition, and the cord in the unwound condition.

The novel kit comprises basically an elongated combined storage body and handle generally denoted A, which body is suitably connected via a heating element means B to soldering tip means C.

The body A is formed of any suitable dielectric material, such as plastic or hard rubber, having heat and electrical insulating characteristics, and includes forward and rearward end portions 10 and 12, respectively, preferably integrally interconnected by the medially reduced cross-section body length 14 serving dually as the cord storage portion and at least part of the main handle portion.

A conventional insulated two or three wire electrical heating cord 16 runs through a central aperture 18 in the body and has the leads of one end thereof connected with the heating element means B, and the other ends connected with a suitable electrical plug 20 for connection with any suitable power source, such as any conventional 110v A.C. C. electrical outlet (not shown) or via a suitable DC-AC converter device 22 to a conventional storage battery, such as a 12v automobile battery 24, schematically shown in FIG. 3.

The rearward body end portion 12 is provided with storage means including a plurality of recessed tubular storage compartments 26 disposed radially around the exit of the cord 16, and extending in an axial direction generally parallel to the central axis of the body. The compartments 26 may extend varying depths into the body according to the need or accommodation length of the materials to be stored therein. Soldering materials, including soldering wire or rods 28, suitable for effecting various kinds of soldering, including stainless steel soldering, together with one or more sealable chambers 30 for holding flux or other chemical compositions, are storable within the recessed compartments 26. The sealable chambers 30 have tightly fitting screw-threaded caps 32 which together act as the first of the double sealing provision. The storage compartments are secondarily sealed by a removable threaded body end cap 34 which is centrally apertured to receive the cord 16, and is suitable recessed at 36 to form a substantial portion of the storage area. Cap 34 is provided with threads 38 complemental to the threads 38' on the body end portion 12, and preferably has its outer diameter co-extensive with that of said end portion 12. The threaded caps 32 and 34 may be provided with supplemental gasket sealing means, if necessary or desired to provide for a more complete hermetical sealing thereof.

The forward end 10 of body A has an outside diameter preferably coextensive with that of the rearward portion 12. The forward end is recessed axially at 40 to at least partially house a conventional electrical heating element assembly 42 which projects a substantial distance from end 10 and is protectively enclosed by a suitably louvred or ventilated housing sleeve member 44. Sleeve member 44 is provided at one end with a transverse radial flange 46 suitably apertured to receive fastening means 48 for attaching the sleeve to the forward body end 10. The other and forwardmost end of the sleeve 44 is fastened by any suitable means, such as screws 50, to the soldering tips means C, which latter means includes a soldering-tip-supporting body 52 provided with an end recess 54 and means for removably and interchangeably mounting any one of a variety of soldering tips 56. While the kit device can be made in various sizes, one ideally compact unit has been made to fit within relatively small or tool boxes only 8 inches in length.

It is apparent that the novelly improved soldering iron kit may be stocked with soldering elements and chemicals to facilitate soldering applications for various metals including stainless steel, iron, brass, copper and others. Accordingly, since the various storage compartments are adapted to house the variety of chemicals and flux and rods necessary to achieve this, it is understandable that the double sealing of the compartments is essential to avoid potential leakage of the chemicals and/or corrosive fumes which may accompany the storage of same.

The subject of this invention readily lends itself to use by home hobby enthusiasts, as well as professional craftsmen, in a variety of uses including television, radio, transistors, auto, boat and aircraft repair shops, electronic schools, watch and jewelry repair on precious and semi-precious metals, toys and musical instruments, among others.

It is apparent that a novel soldering kit has been evolved which achieves the objects and advantages set forth in the preamble and elsewhere throughout this specification, including captively maintaining the body end cap 34 in association with the kit by the provision of the cord passing snugly through an aperture in the cap to maintain the desired sealing, and that various changes and alterations may be made in the specific constructional details without departing from the inventive scope as defined in the appended claims.

What is claimed is:

1. A completely self-contained, portable soldering iron kit comprising, in combination:
   a. an elongated body having forward and rearward end portions of substantially the same diameter separated by a reduced diameter generally cylindrical medial body portion; said body defining a combined tool handle and storage compartment;
   b. an electric heating element and soldering tip means connected to and projecting from the forward body end;
   c. selectively openable and closeable storage cavity means provided in the rearward body portion, said storage cavity means including a plurality of rearwardly open, axially extending recesses formed in the end of said rearward end portion and defining a plurality of tubular storage compartments, said storage cavity means further including:
      1. a removable cup-shaped end cap having thread means for removable attachment to complementary thread means on the end of said rearward body portion such that the recessed portion of the cut-shaped cap defines with the end of the body an enlarged storage area into which the tubular compartments open when the cap is in place on the body;
      2. at least one of said tubular storage compartments having disposed therein a container of liquid chemical substance needed to perform a soldering operation, others of said compartments adapted to hold metallic solder;
   d. said body being provided with an axial passageway extending from one end of the body to the other, a length of insulated electrical cord having one end connected with the heating element means, said cord extending rearwardly through said passageway into said enlarged storage area and passing freely through an aperture in the end cap; a connector means on the other end for connection with a source of electrical power, whereby said cap is removably but captively retained in association with the body; and
   e. wherein the length of the cord extending from the rear of said body is of such length as to be substantially accommodated as a single layer when wound on the reduced diameter medial portion for storage when the tool is not in use.

2. The combination as defined in claim 1 wherein the tool is energized from an A.C. power source.

3. The combination as defined in claim 1 wherein the tool is energized from a D.C. power source by means of an DC-AC convertor connected therewith.

* * * * *